(12) United States Patent
Henkel et al.

(10) Patent No.: US 9,194,480 B2
(45) Date of Patent: Nov. 24, 2015

(54) PLANETARY GEAR ALIGNMENT AND INDEXING METHOD AND ASSOCIATED TOOL

(71) Applicant: CNH America, LLC, New Holland, PA (US)

(72) Inventors: Edmund R. Henkel, Naperville, IL (US); Randolph J. Pope, Racine, WI (US); Scott Spencer, Franksville, WI (US)

(73) Assignee: CNH Industrial America LLC, New Holland, PA (US)

( * ) Notice: Subject to any disclaimer, the term of this patent is extended or adjusted under 35 U.S.C. 154(b) by 265 days.

(21) Appl. No.: 14/018,837

(22) Filed: Sep. 5, 2013

(65) Prior Publication Data

US 2014/0165403 A1    Jun. 19, 2014

Related U.S. Application Data

(60) Provisional application No. 61/738,614, filed on Dec. 18, 2012.

(51) Int. Cl.
*F16H 57/023* (2012.01)
*F16H 1/28* (2006.01)
*F16H 57/00* (2012.01)

(52) U.S. Cl.
CPC ............. *F16H 57/023* (2013.01); *F16H 1/28* (2013.01); *F16H 2057/0056* (2013.01); *F16H 2057/0062* (2013.01); *Y10T 29/49465* (2015.01); *Y10T 29/53913* (2015.01)

(58) Field of Classification Search
CPC .......... F16H 57/023; F16H 2057/0056; F16H 2057/0062; F16H 1/28; Y10T 29/53913; Y10T 29/49465
See application file for complete search history.

(56) References Cited

U.S. PATENT DOCUMENTS

| | | |
|---|---|---|
| 5,165,156 A | 11/1992 | Shultz |
| 5,864,950 A | 2/1999 | Harata et al. |
| 6,148,533 A | 11/2000 | Hutter |
| 6,651,522 B2 | 11/2003 | Petocchi et al. |
| 6,663,531 B2 | 12/2003 | Skrabs |
| 6,938,316 B1 | 9/2005 | Case |
| 7,401,415 B2 | 7/2008 | Musuraca |
| 8,333,679 B2 * | 12/2012 | Richter et al. ........ 475/331 |
| 2006/0112531 A1 | 6/2006 | Skrabs |

FOREIGN PATENT DOCUMENTS

| | | | |
|---|---|---|---|
| CN | 201565771 U | 9/2010 | |
| CN | 202412163 U | 9/2012 | |
| DE | 102010051946 A1 | 5/2012 | |
| JP | 2005337400 A * | 12/2005 | ....... F16H 1/28 |

* cited by examiner

*Primary Examiner* — Ryan J Walters
(74) *Attorney, Agent, or Firm* — Sue C. Watson

(57) ABSTRACT

A method is disclosed for assembly of a planetary gear drive, wherein the gear drive includes a ring gear, a sun gear, and a plurality of planet gears engaged with the ring gear and sun gear. The method includes mounting the planet gears within a carrier, with the planet gears freely rotatable relative to the carrier. A gear alignment tool is inserted through a bore in a front face of the carrier and is used to index the planet gears into an aligned rotational position for proper subsequent engagement with the ring gear and sun gear.

8 Claims, 6 Drawing Sheets

PLANETARY GEAR ALIGNMENT AND INDEXING METHOD AND ASSOCIATED TOOL

CROSS-REFERENCE TO RELATED APPLICATIONS

This application is based upon and claims priority to U.S. Provisional Application No. 61/738,614, filed on Dec. 18, 2012, the disclosure of which is hereby incorporated by reference herein in its entirety for all purposes.

FIELD OF THE INVENTION

The present invention relates generally to the assembly of gear trains, and more particularly to assembly of planetary gear trains having a blind planetary gear carrier.

BACKGROUND OF THE INVENTION

A consistent problem with assembling gear trains is the proper alignment and indexing of the gear components. If the gears are not properly aligned, backlash can result, which can produce excessive wear and failure of the gears. The assembly time and difficulty associated with ensuring proper gear alignment is well known to those skilled in the art.

Certain types of planetary gear drives are particularly problematic. With these drives, the planet gears are mounted to a carrier (e.g., via needle bearings) and are free to rotate. The carrier is a generally closed-ended housing that is subsequently bolted to the transmission casing, and the planet gears are not visible during this assembly step. For this reason, this type of planetary gear carrier is often referred to as a "blind carrier." However, all of the planet gears must be in an exact location in order to properly engage the sun gear and ring gear. Visual aids to ensure this exact alignment cannot be used with the blind carrier because of the depth of the planet gears within the carrier. The conventional processes for assembly of the planetary gear carrier to the transmission (or other drive) are tedious, difficult, and time consuming.

An improved method and associated tool for reducing the complexity and time associated with assembly of a planetary gear drive would be a welcome advancement in the industry.

BRIEF DESCRIPTION OF THE INVENTION

Aspects and advantages of the invention will be set forth in part in the following description, or may be obvious from the description, or may be learned through practice of the invention.

In accordance with aspects of the invention, a method is provided for assembly of a planetary gear drive, wherein the gear drive includes a ring gear, a sun gear, and a plurality of planet gears engaged with the ring gear and sun gear. The planet gears are mounted on bearings within a carrier and are freely rotatable relative to the carrier. A gear alignment tool is inserted through a bore in a front face of the carrier. The bore may be provided specifically for this purpose, or may be provided in the carrier housing for another function, for example as a lubrication access point. The tool is used to engage and index the planet gears into a relative rotational position for proper subsequent engagement with the ring gear and sun gear. With the planet gears properly indexed and maintained in position with the tool, the carrier is mounted onto a casing of the gear drive so that the planet gears engage the ring gear and sun gear. The tool may be withdrawn from the carrier before or during mounting of the carrier onto the gear casing.

In a particular embodiment, the tool has a plurality of engagement fingers that are oriented in a first longitudinal position that allows the tool to slide through the bore in the front face of the carrier. The method includes inserting the tool to a central position within the carrier equidistant to the planet gears and radially expanding the engagement fingers from the central position such that the engagement fingers engage and index the planet gears. The fingers may be actuated by any suitable means, including manual, hydraulic, pneumatic, or electric actuating devices.

In one embodiment, the fingers reside within a cage structure at an end of the tool in the first longitudinal position and include an elongated slot engaged by a pin in the cage structure. The fingers are caused to radially expand by axially advancing the cage into the central position within the carrier while preventing axial movement of the fingers, thereby causing the fingers to radially spread as a result of relative movement of the pins (and cage structure) within the respective slots of the axially stationary fingers. With this embodiment, the tool may be manually advanced through the carrier while axial movement of the fingers is manually prevented to cause the free end of the fingers to spread radially outward.

The present invention also encompasses an alignment and indexing tool for assembly of a planetary gear drive as discussed above wherein a carrier housing having a plurality of planet gears mounted therein is to be mounted onto a gear casing for subsequent engagement with a ring gear and a sun gear. In a particular embodiment, the tool includes an elongated handle having a sufficient length to pass through a bore in the carrier housing to a central position within the carrier equidistant to the planet gears. The tool includes a plurality of engagement fingers mounted to an end of the handle. The engagement fingers are oriented in a first longitudinal position relative to the handle that allows the tool to slide through the bore and into the carrier housing. The engagement fingers are radially expandable relative to the handle from the first longitudinal position to a spread position wherein the engagement fingers engage and index the planet gears to a rotational position for proper subsequent engagement with the ring gear and sun gear upon mounting the carrier onto the gear casing.

In an embodiment wherein the tool is intended for a planetary gear drive having three planet gears, the tool includes three engagement fingers rotationally spaced 120 degrees apart on the handle.

In a particularly unique embodiment, the engagement fingers reside within a cage structure at an end of the handle in the first longitudinal position. The fingers have a first end pivotally mounted to the cage structure and a second free end that is radially movable away from the cage structure to engage the planet gears.

Actuation of the engagement fingers to their spread position may be variously affected. For example, the tool may include any manner of hydraulic, pneumatic, or electrical actuating device configured to cause the fingers to pivot radially outward from the cage structure. In a certain embodiment, the engagement fingers include an elongated slot that is engaged by a pin in the cage structure. With this configuration, the engagement fingers are caused to radially spread by axial movement of the cage structure into the central position while preventing axial movement of the free ends of the engagement fingers. In this manner, continued relative movement of the pins within the slots causes the free ends of the fingers to move radially outward. With this embodiment, the fingers are movable from the radially spread position to the first longitudinal position within the cage structure upon withdrawing the handle from the carrier.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
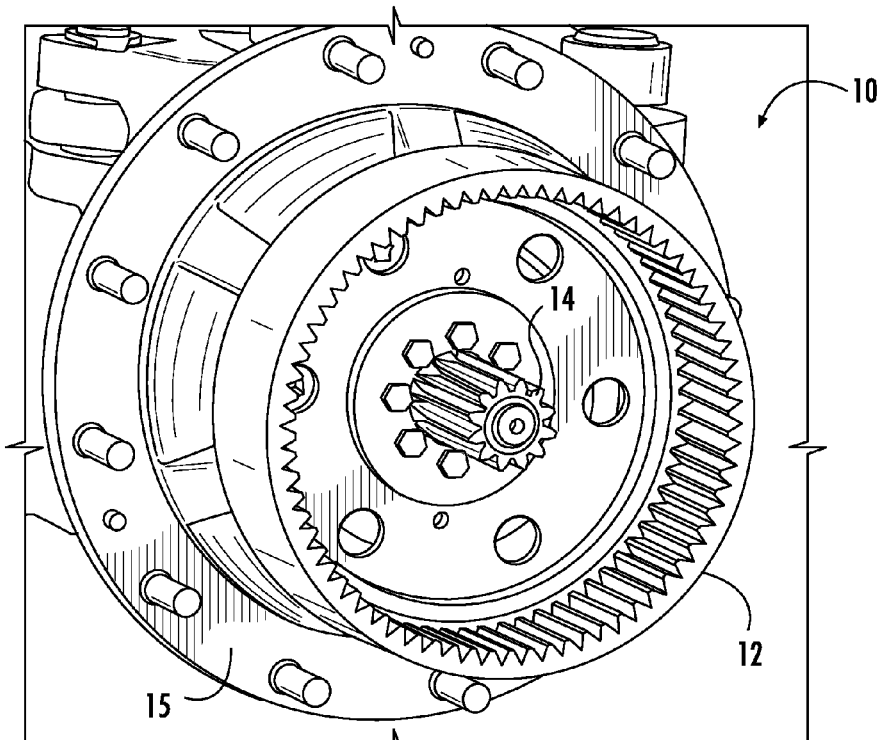
FIG. 1 is a front perspective view of components of a planetary gear drive.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In accordance with aspects of the invention, a method is provided for assembly of a planetary gear drive. Referring to FIGS. 1 through 5 in general, an exemplary gear drive 10 includes a ring gear 12, a sun gear 14 mounted on a bearing 17, and a plurality of planet gears 16 engaged with the ring gear 12 and sun gear 14. The planet gears 16 are mounted on bearings 18 within a carrier 20 and are freely rotatable relative to the carrier 20. In the illustrated embodiment, the carrier 20 is a generally closed-end housing having a front face 22 and a circumferential side wall 24. The carrier 20 (with mounted planet gears 16) is bolted onto a gear casing 15 (FIG. 2) via a flange 26.

Figure 2:
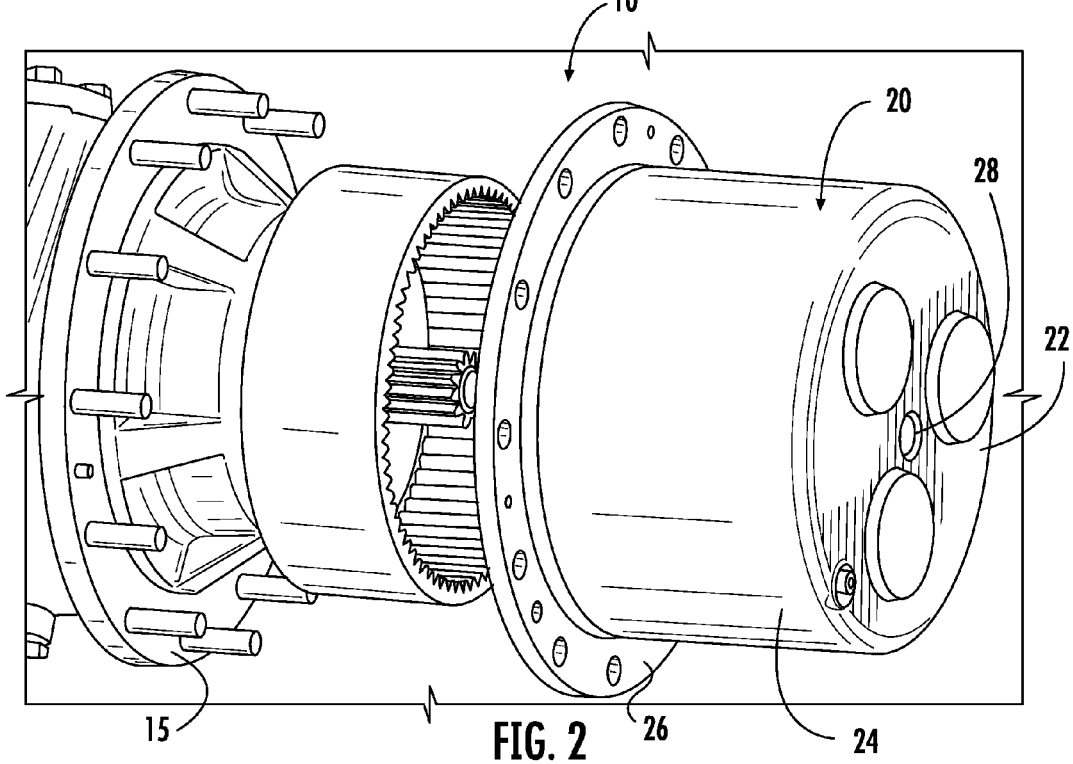
FIG. 2 is a side perspective view of components of a planetary gear drive.
Figure 3:
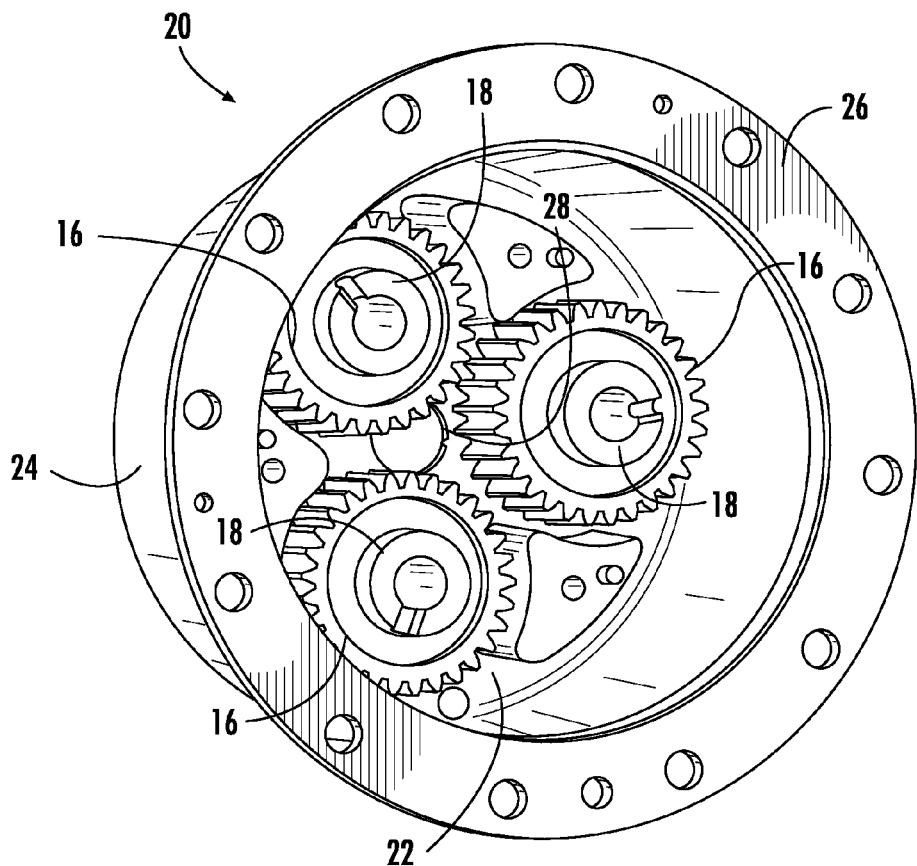
FIG. 3 is a perspective view of planet gears within a carrier housing.

It should be appreciated that, because of the depth of the planet gears 16 within the carrier 20, the gears are not visible when mounting the carrier 20 onto the gear casing 15, as depicted in FIG. 2. The carrier 20 is considered a "blind" carrier in this regard in that the operator does not have the ability to visually ascertain whether or not the planet gears (which are freely rotatable on the carrier 20) are rotationally aligned for simultaneous engagement with the ring gear 12 and sun gear 14.

Figure 5:
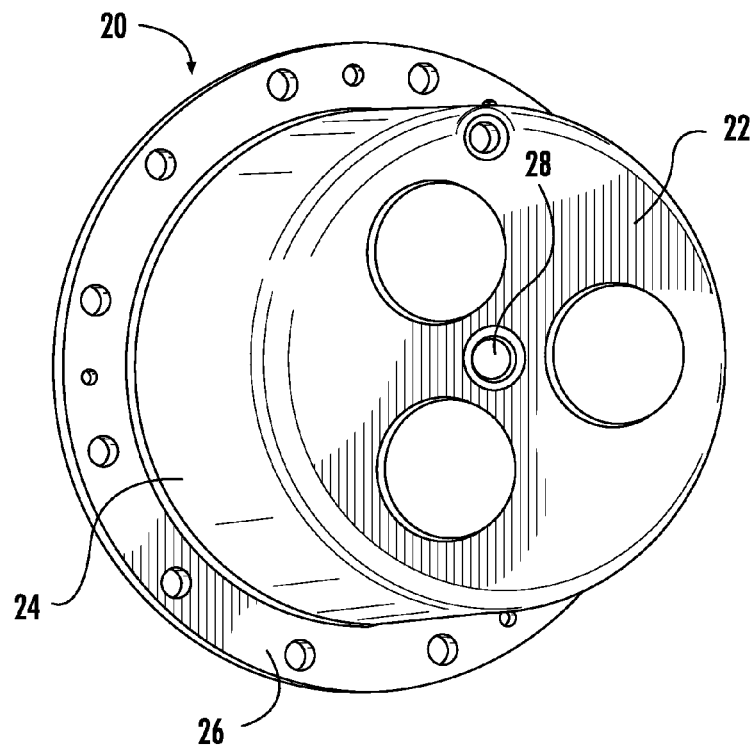
FIG. 5 is a front perspective view of a planet gear carrier.

Referring particularly to FIGS. 2 and 5, a bore 28 is defined through the front face 22 of the carrier 20. The bore 28 is generally coaxial with the sun gear 14 and may be used as an external lubrication port to grease the sun gear bearing 17. For purposes of the present disclosure, the bore 28 provides access to a central location within the carrier 20 that is equidistant to the plurality of planet gears 16, as can be readily appreciated from FIGS. 11 and 12. In particular embodiments, the bore 28 has a diameter corresponding generally to the diameter of the bearing 17.

Figure 4:
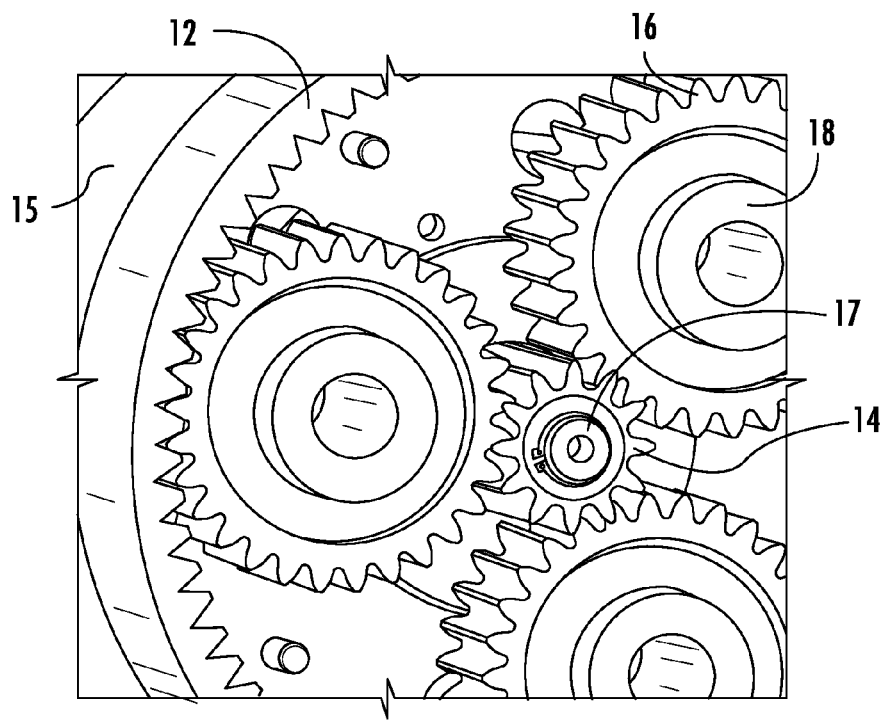
FIG. 4 is a perspective view of planet gears engaged with a ring gear and sun gear within a planetary gear drive.

Referring to FIGS. 6 through 13 in general, a gear alignment tool 30 is provided for externally accessing the planet gears 16 through the bore 28 and indexing the planet gears 16 to a rotational position wherein the gears 16 are properly aligned for simultaneous engagement with the ring gear 12 and sun gear 14, as depicted in FIG. 4.

Figure 9:
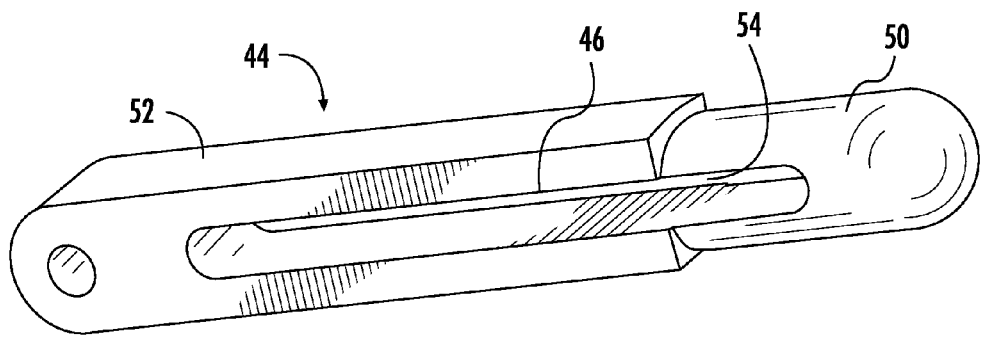
FIG. 9 is a perspective view of one of the engagement fingers of the tool of FIG. 6.
Figure 10:
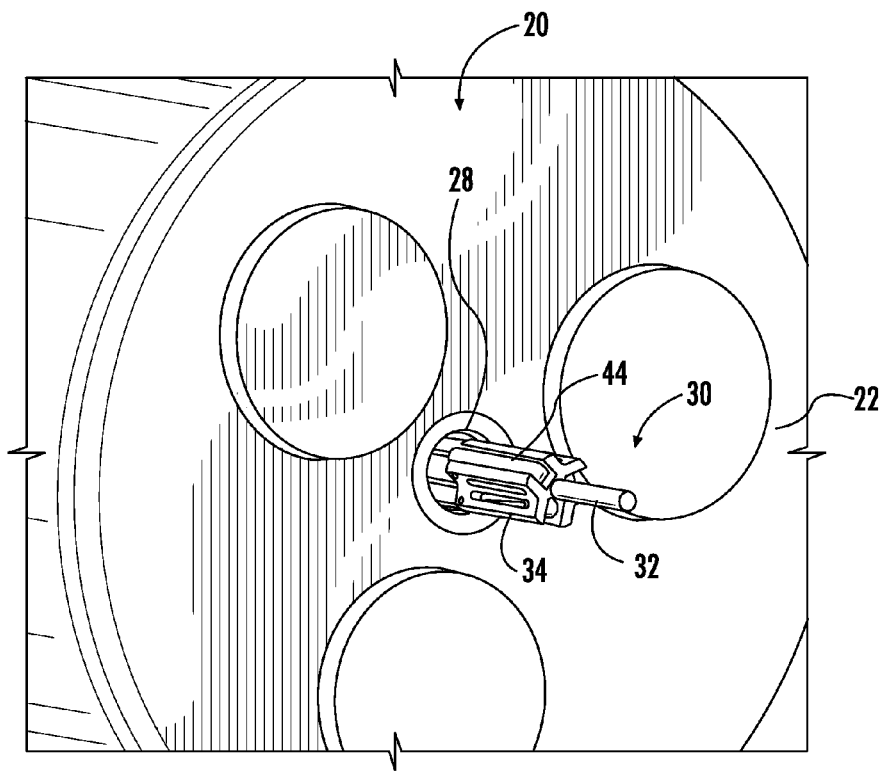
FIG. 10 is a perspective view of the tool of FIG. 6 being inserted through the planet gear carrier of FIG. 5.
Figure 11:
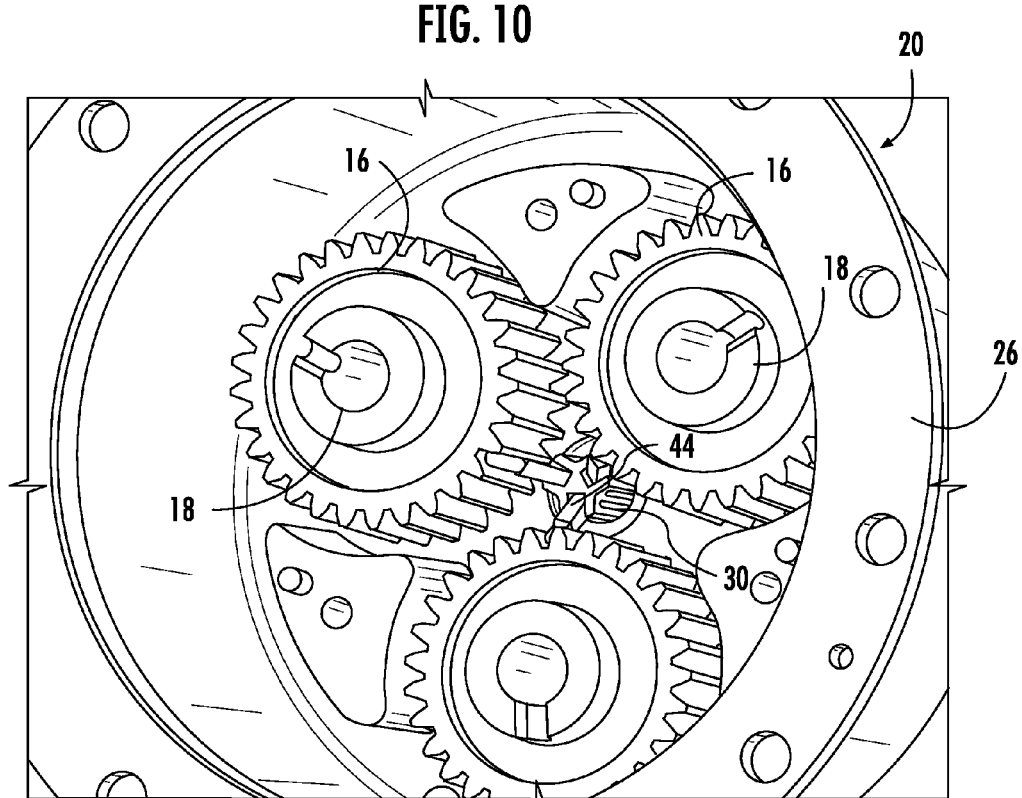
FIG. 11 is a perspective view of the tool of FIG. 6 engaged with planet gears mounted within the carrier of FIG. 5.

A particular embodiment of the gear alignment tool 30 is depicted in FIGS. 6 through 9. In this embodiment, the tool 30 includes a handle 32 with a cage structure 34 configured at an end thereof. The handle 32 has a length sufficient to ensure that the cage structure 34 can be completed inserted through the bore 28 into the central position with the carrier 20, as depicted in FIGS. 10 and 11. The cage structure 34 includes a plurality of ribs 36 that define elongated grooves 38 equally spaced around a circumference of the cage structure 34. For example, in an embodiment wherein the tool 30 is intended to work with a planetary gear drive 10 having three planet gears 16, the grooves 38 are radially spaced 120-degrees apart. The cage structure 24 includes a pin 42 inserted through pin holes 40 at a forward end of each groove 38. It should be readily appreciated that the construction and configuration of the cage structure 34 may vary widely within the scope and spirit of the present invention.

Figure 6:
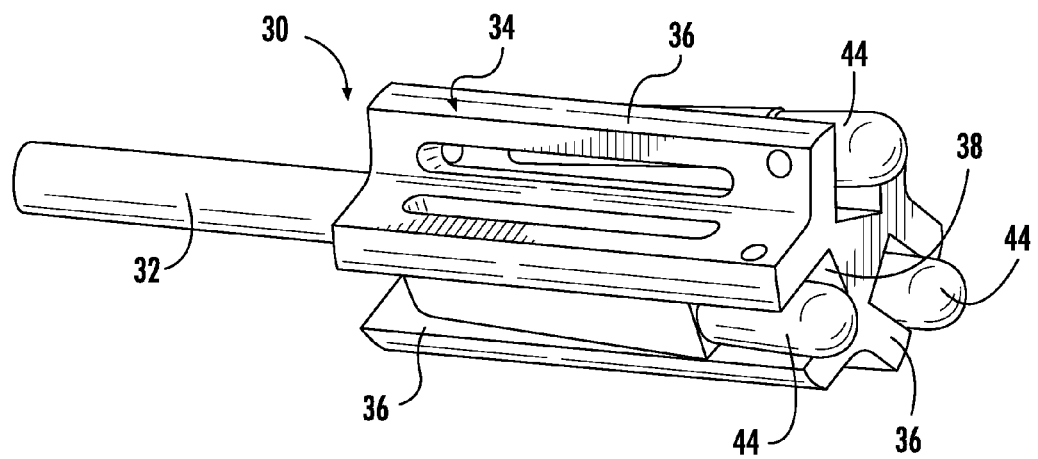
FIG. 6 is a perspective view of an embodiment of a gear engagement tool in accordance with aspects of the invention.
Figure 7:
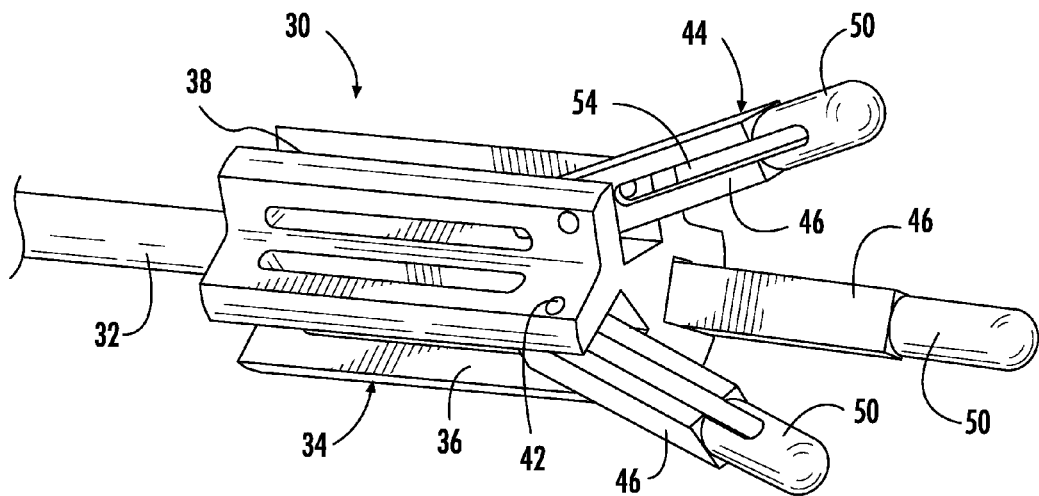
FIG. 7 is a perspective view of the gear engagement tool of FIG. 6 in a first operational state.
Figure 8:
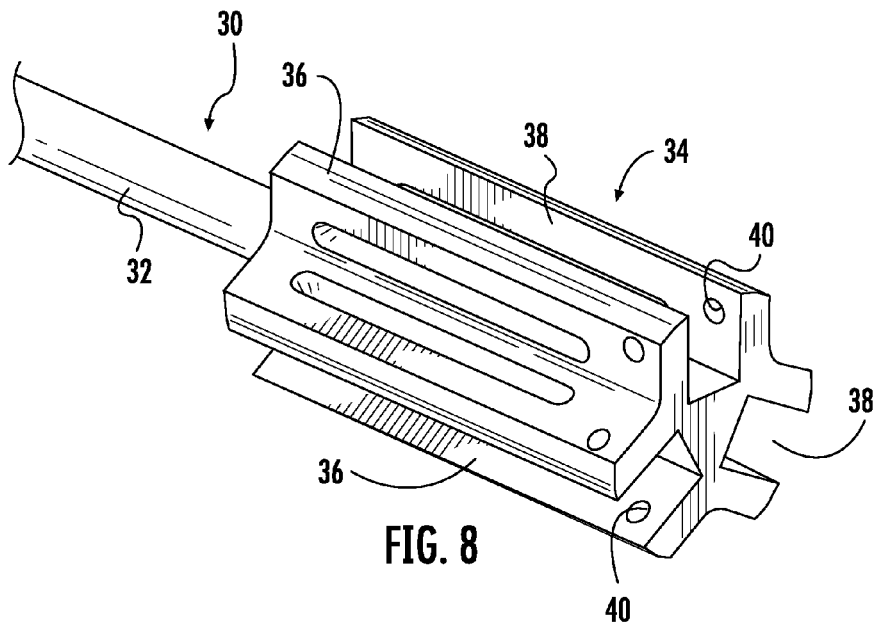
FIG. 8 is a perspective view of the handle and cage structure of the tool of FIG. 6.

The tool 30 of the illustrated embodiment includes a plurality of engagement fingers 44 oriented in a first longitudinal position within the grooves 38 depicted in FIG. 6 that allows the tool (specifically, the cage structure 34) to slide through the bore 28 in the front face of the carrier 20 as depicted in FIG. 10. The fingers 44 have a first end 52 that is pivotally mounted to the cage structure within a respective groove 38, and a second free end that is radially movable away from the cage structure 34 to engage the planet gears, as depicted for example in FIGS. 12 and 13. Referring to FIG. 9, the fingers 44 include a body portion 46 having a cross-sectional shape corresponding to that of the groove 38 in the cage structure 34, and a free end 50 extending from the body portion 46 and having a shape suitable for engaging between the teeth of the planet gears 16. The engagement fingers 44 include an elongated slot 54 through which the pin 42 of the cage structure 34 extends.

Figure 12:
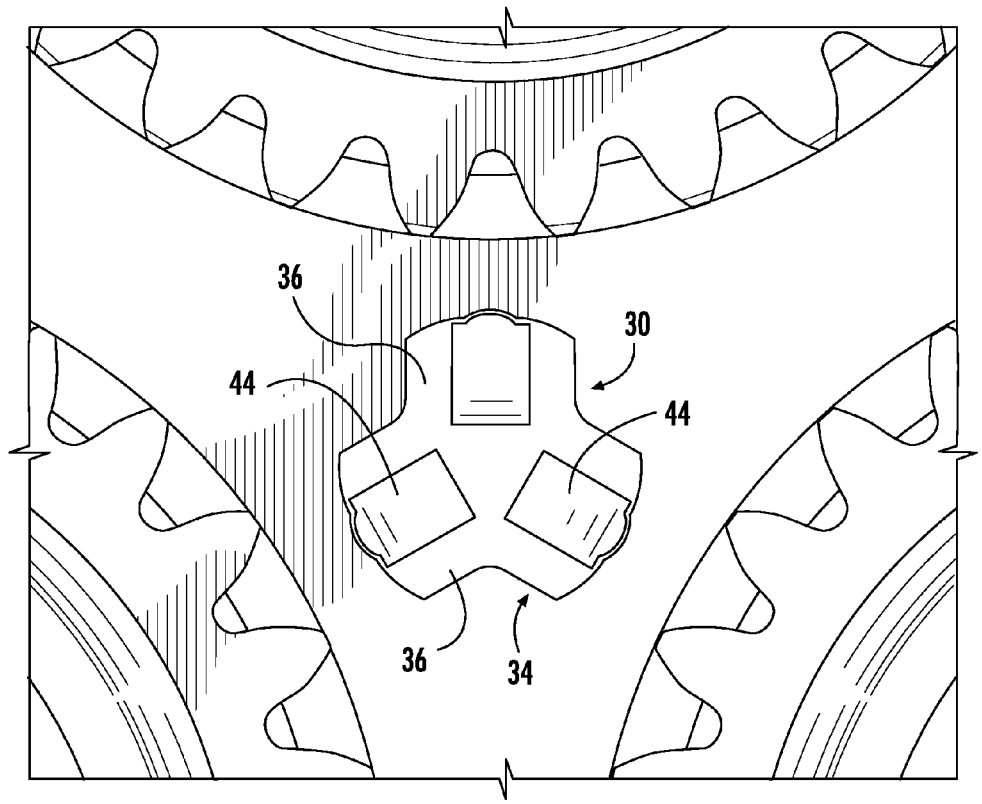
FIG. 12 is an enlarged front view of the gear engagement tool within the planet gear carrier prior to spreading of the engagement fingers.

In the first longitudinal position of the fingers 44 depicted in FIGS. 6 and 12, the fingers 44 "rest" within the grooves 38 so that the cage structure 34 can be inserted through the bore 28 in the carrier 20 (FIG. 10). Once the cage structure 34 is in the central position relative to the planet gears 16 (FIG. 11), the engagement fingers 44 are caused to radially spread to the position depicted in FIGS. 7 and 13 by axial movement of the cage structure 34 further into the central position while preventing axial movement of the free ends 50 of the engagement fingers 44. In this manner, continued relative movement of the pins 42 within the slots 54 of the engagement fingers 44 causes the free ends 50 of the fingers 44 to move or spread radially outward. With this embodiment, the tool 30 may be manually advanced through the carrier 20 while axial movement of the fingers 44 is manually prevented (to cause the free end 50 of the fingers 44 to spread radially outward).

In alternate embodiments, actuation of the engagement fingers 44 to their spread position may be variously affected. For example, the tool 30 may include any manner of hydraulic, pneumatic, or electrical actuating device configured to cause the fingers 44 to pivot radially outward from the cage structure 34.

Figure 13:
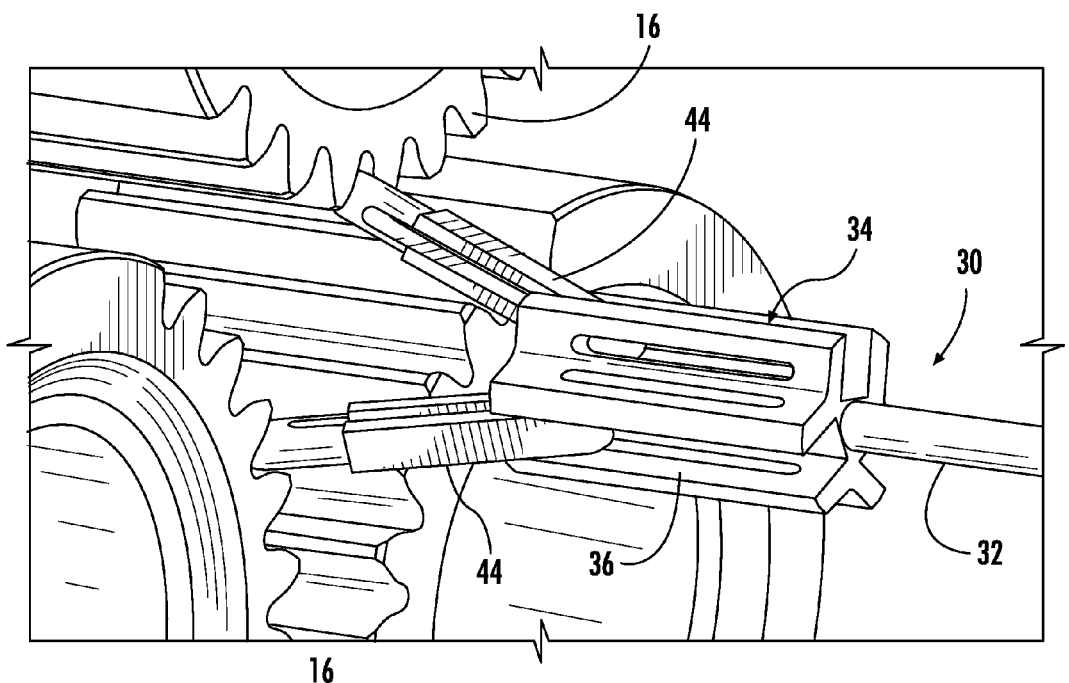
FIG. 13 is an enlarged perspective view of the gear engagement tool with the fingers radially spread to an engagement position with the planet gears.

As can be readily appreciated from FIGS. 11 through 13, when the fingers 44 spread, they come into contact with the planet gears 16. If any one of the gears 16 is rotationally misaligned, the respective finger 44 will push or index the gear 16 into its proper rotational position until the finger 44 engages completely between adjacent teeth of the gear 16, as depicted in FIG. 13. With the fingers 44 engaged with the gears 16, the gears are held in their aligned rotational position for subsequent engagement with the ring gear 12 and sun gear 14 as the carrier 20 is advanced towards the casing 15 (FIG. 2).

The tool 30 may be withdrawn from the carrier 20 before or during mounting of the carrier 20 onto the gear casing 15.

As mentioned, the present invention also encompasses an alignment and indexing tool 30 (standing alone) for assembly of a planetary gear drive 10, as discussed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembly of a planetary gear drive, wherein the gear drive includes a ring gear, a sun gear, and a plurality of planet gears engaged with the ring gear and sun gear, the method comprising:
   mounting the planet gears on bearings within a carrier, the planet gears freely rotatable relative to the carrier;
   inserting a gear alignment tool through a bore in a front face of the carrier to a central position within the carrier equidistant to the planet gears, the tool including an elongated handle having a sufficient length to pass through the bore and a plurality of engagement fingers oriented in a first longitudinal position that allows the tool to slide through the bore, the engagement fingers residing within a cage structure at an end of the handle in the first longitudinal position, the engagement fingers having a first end pivotally mounted to the cage structure and a second free end that is radially movable away from the cage structure to engage the planet gears;
   with the tool, radially spreading the engagement fingers from the central position such that the engagement fingers index the planet gears into an aligned rotational position for proper subsequent engagement with the ring gear and sun gear; and
   with the planet gears properly indexed and maintained in position with the tool, mounting the carrier onto a casing of the gear drive so that the planet gears engage the ring gear and sun gear.

2. The method as in claim 1, wherein the fingers include an elongated slot engaged by a pin in the cage structure, wherein in the fingers are caused to radially spread by axially advancing the cage into the central position while preventing axial movement of the fingers thereby causing the free ends of the fingers to radially spread as a result of relative movement of the pins within the respective slots.

3. The method as in claim 2, wherein the tool is manually advanced through the carrier and the axial movement of the fingers is manually prevented.

4. The method as in claim 1, wherein the tool is removed from the carrier prior to or during mounting of the carrier onto the casing.

5. An alignment and indexing tool for assembly of a planetary gear drive, wherein a carrier housing having a plurality of planet gears mounted therein is to be mounted onto a gear casing for subsequent engagement with a ring gear and a sun gear, said tool comprising:
   an elongated handle having a sufficient length to pass through a bore in the carrier housing to a central position within said carrier equidistant to the planet gears;
   a plurality of engagement fingers mounted to an end of said handle, said engagement fingers oriented in a first longitudinal position relative to said handle that allows said tool to slide through the bore and into the carrier housing;
   said engagement fingers radially spreadable relative to said handle from said first longitudinal position to a spread position wherein said engagement fingers engage and index the planet gears to an aligned rotational position for proper subsequent engagement with the ring gear and sun gear upon mounting the carrier onto the gear casing,
   wherein said engagement fingers reside within a cage structure at an end of said handle in said first longitudinal position, said engagement fingers having a first end pivotally mounted to said cage structure and a second free end that is radially movable away from said cage structure to engage the planet gears.

6. The alignment and indexing tool as in claim 5, comprising three of said engagement fingers rotationally spaced 120 degrees apart on said handle, wherein said tool is configured for indexing three planet gears within the carrier.

7. The alignment and indexing tool as in claim 5, wherein said engagement fingers include an elongated slot engaged by a pin in said cage structure, wherein said engagement fingers are caused to radially spread by axial movement of said cage structure into the central position while preventing axial movement of said free ends of said engagement fingers.

8. The alignment and indexing tool as in claim 7, wherein said engagement fingers are movable from said radially expanded position to said first longitudinal position upon withdrawing said handle from said carrier.

* * * * *